April 4, 1944.     J. T. SERDUKE     2,345,835
DEVICE FOR COLLECTING ELECTRIC CURRENT
Filed March 30, 1942     2 Sheets-Sheet 1
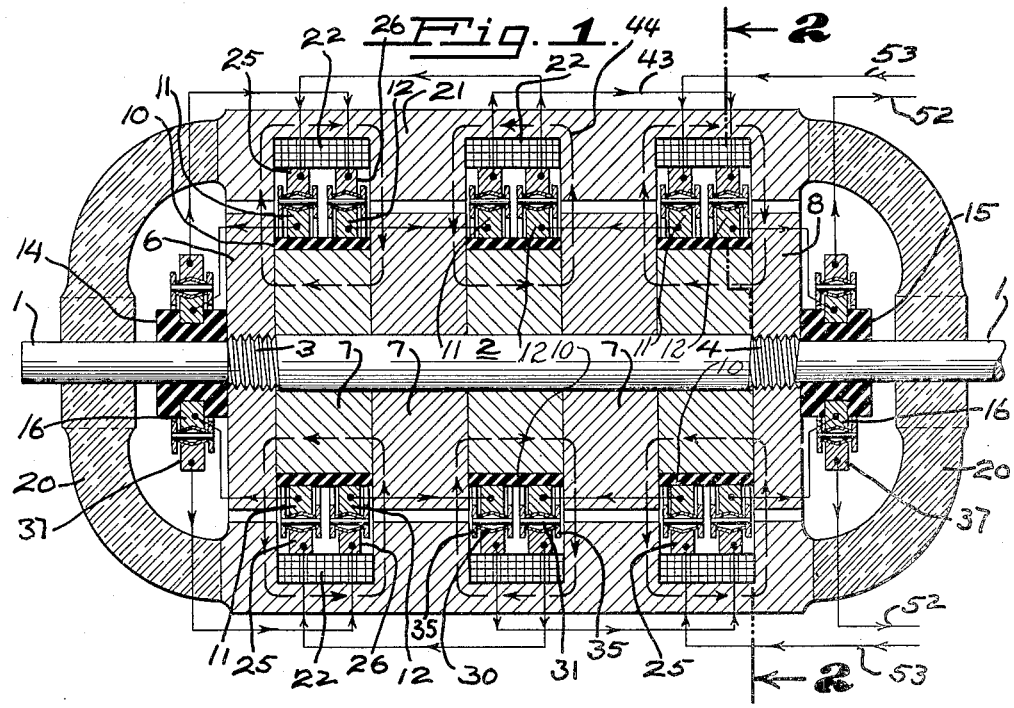
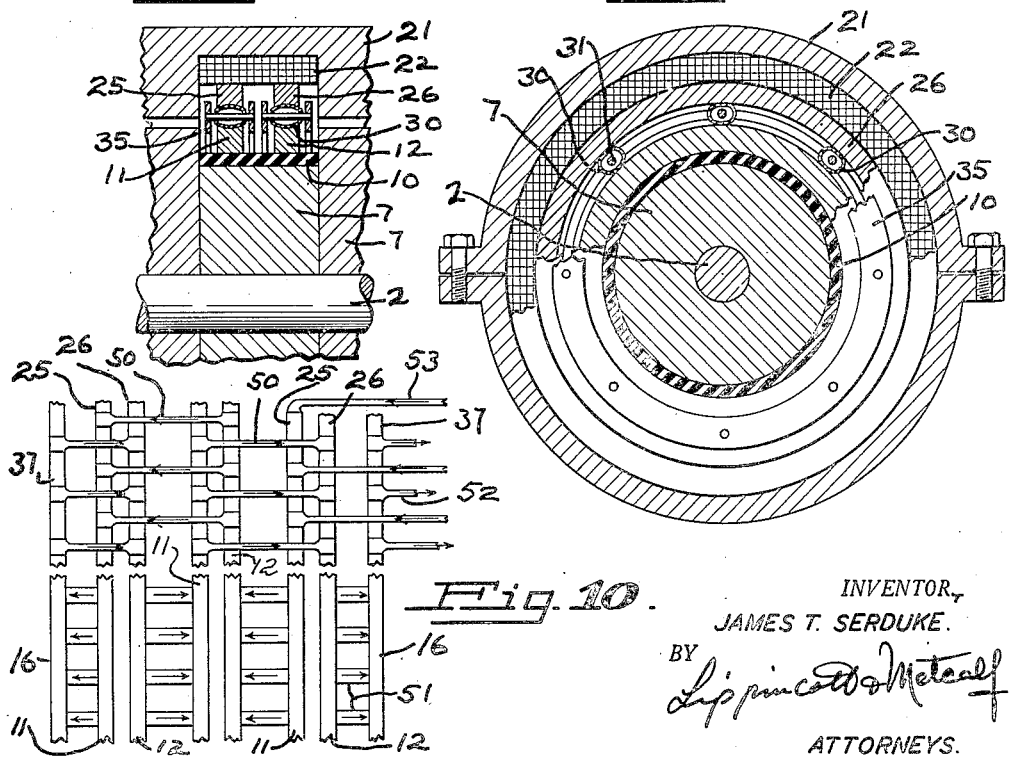
INVENTOR,
JAMES T. SERDUKE.
BY
ATTORNEYS.

April 4, 1944. J. T. SERDUKE 2,345,835
DEVICE FOR COLLECTING ELECTRIC CURRENT
Filed March 30, 1942 2 Sheets-Sheet 2
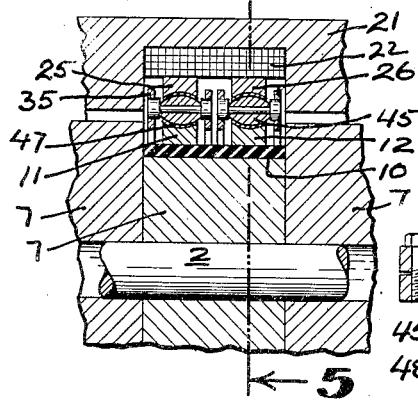
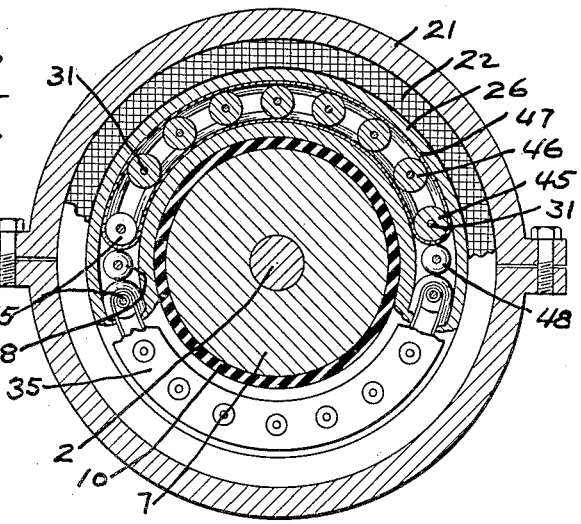
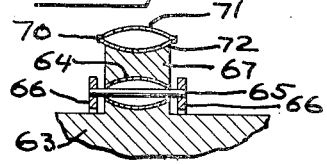
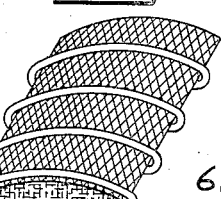
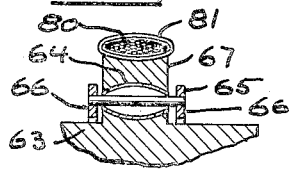
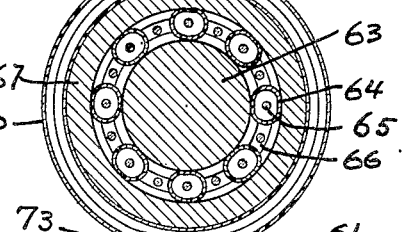
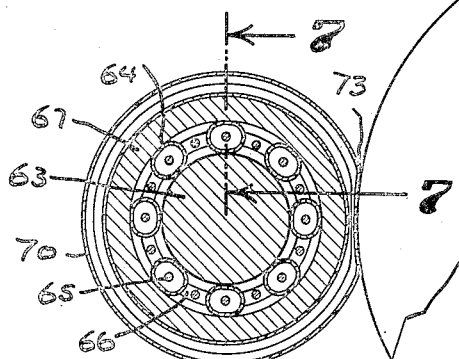
INVENTOR,
JAMES T. SERDUKE.
BY
Lippincott & Metcalf
ATTORNEYS.

Patented Apr. 4, 1944

2,345,835

UNITED STATES PATENT OFFICE 2,345,835

DEVICE FOR COLLECTING ELECTRIC CURRENT

James T. Serduke, Berkeley, Calif.

Application March 30, 1942, Serial No. 436,918

13 Claims. (Cl. 171—322)

My invention relates to devices for collecting electric current from a rotating conducting surface or surfaces of either direct or alternating current generators or motors and transferring this current to a stationary surface or surfaces to which wires or cables leading to or from electric transmission lines are attached.

My invention is particularly applicable to such devices where high current densities are required. My invention will provide satisfactory operation at such current densities at high peripheral speeds of the moving conducting surface or surfaces being contacted.

In motors and generators, the devices utilized for collecting current, as commonly constructed, are stationary brushes made of carbon, or carbon compositions, frictionally contacting the moving conductor. Current densities are utilized within the range of between 30 and 100 amperes per square inch and the rubbing speed, is in the neighborhood of and usually below 6,000 feet per minute. Such brushes present difficulties in high speed electrical machines, such as, for example, turbogenerators, on account of the high peripheral speed of contact. The brushes wear down rapidly and, for example, even in the case of collector rings in alternating current machines there is a tendency for the current to arc between the brush and the collector ring.

The above difficulties inherent in the usual type of brush limits the effective speed of generators and motors, and likewise limits the induced voltage per unit length of effective conductor in the armature winding. Longer effective conductor lengths for a given terminal voltage are required as well as additional iron, thus causing a resultant increase in the weight of the machine.

It is the main object of the present invention to provide a novel and improved device for transferring or conducting current from circular rotating conducting surface or surfaces in electrical machines to a stationary circular conducting surface or surfaces to which an electric conductor is attached.

Another object of my invention is to provide a current-collecting device which will eliminate rubbing friction entirely and substitute rolling friction therefor.

A further object of my invention is to provide a current-collecting device which will give satisfactory operation, for example, at the higher current densities of, for example, 100 amperes per square inch, and which will also give satisfactory operation at relative peripheral speeds of more than 10,000 feet per minute.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself in any way, to the apparatus of the present application, as I may adopt various other apparatus embodiments, utilizing the method, within the scope of the appended claims.

In the drawings.

Fig. 1 is a longitudinal sectional view, partly diagrammatic, showing one form of my invention as applied to a unipolar generator utilizing high current densities through the current collectors.

Fig. 2 is a cross-sectional view, partly in elevation, shown as indicated by the line 2—2 in Fig. 1.

Fig. 3 is a partial view showing a modified form of current collector for use in the device of Fig. 1.

Fig. 4 is a partial sectional view of another modification that may be used in the device of Fig. 1.

Fig. 5 is a cross-sectional view taken as indicated by the line 5—5 in Fig. 4.

Fig. 6 is a sectional view partly diagrammatic showing how my invention may be applied to a D. C. generator of the commutator type.

Fig. 7 is a cross-sectional view taken as indicated by the line 7—7 in Fig. 6.

Fig. 8 is a partial cross-sectional view showing a modification of the device shown in Figs. 6 and 7.

Fig. 9 is a diagrammatic enlarged perspective view of the contacting element of the modification shown in Fig. 8.

Fig. 10 is a diagram showing the connections of the rings in the device of Fig. 1, the rings being represented as cut and flattened into a plane.

While I have shown my invention as applied herein to unipolar and to commutator types of D. C. generators, I wish it to be distinctly understood that such examples are exemplary only and that my invention may be utilized for collecting current in any type of machine where the problems solved herein can be similarly solved.

Referring directly to the drawings for a more detailed understanding of my invention, and first describing my invention as utilized on a unipolar generator, a central shaft 1 is provided with a central enlarged portion 2 terminating in threaded portions 3 and 4.

In assembling the rotating portion of the machine an end plate 6 of magnetic material is screwed on threads 3 and a plurality of discs 7 of magnetic material are then mounted serially on the shaft, these discs being held together by an opposite end plate 8 mounted on threads 4. Also the discs could be bolted together. Adjacent discs are of different diameters and alternate discs have the same diameter, the end and central discs being of the smaller diameter.

Mounted on each of the two end discs 7 of smaller diameter is an insulating cylinder 10 each carrying inner rotating rings 11 and 12. A similar arrangement is utilized on the central disc 7. Insulating hubs 14 and 15 are mounted on the opposite ends of shaft 1 respectively, adjacent the end plates 6 and 8, and each of these hubs carries rotating collector ring 16. Thus rotating collector rings 11, 12 and 16 rotate with the shaft, the attached end plates and discs.

The shaft 1 is mounted to rotate in a nonmagnetic frame 20, supporting a split cylindrical field block 21 of magnetic material, this cylindrical field block being provided with three field windings 22 energized in any convenient manner, set into the inner surface of the block opposite each armature disc of smaller diameter. Each field winding carries adjacent stationary collector rings 25 and 26 extending toward rotating collector rings 11 and 12, leaving a space therebetween. A plurality of resilient conducting rolling elements 30 are mounted between rotating and stationary collector rings on shafts 31 extending axially therethrough, these shafts being attached at the ends thereof to cage rings 35 positioned one on each side of opposing stationary and rotating collector rings.

In Fig. 1 the rolling resilient elements are shown to have substantially a diamond shape in section, and are slightly flattened between the concave faces of the stationary collector rings and opposing rotating collector rings. A similar structure is utilized in the smaller collector rings mounted on hubs 14 and 15 with outer stationary collector rings 37 being provided opposed to the inner rotating collector rings 16.

In Fig. 1 I have shown the collector ring connections diagrammatically as indicated by solid lines 43. Because of high currents carried by the rings, I prefer to connect the rings at several places around the circumference thereof, as shown diagrammatically in Fig. 10. Here the rings are shown as if cut and laid out in a plane, with cross connections 50 between stationary rings 25 and 26, and with cross connections 51 between rotating rings 11, 12 and 16. One output connection 52 may be taken from one end collector ring 37 at several places therearound and from an exterior connection 53, connected in several places therearound to the stationary ring 25 nearest the output end of the device. The flux path in the armature and field are indicated by the broken lines 44, the direction of the flux being shown by the arrows attached to the broken lines in Fig. 1.

The device, as above described, is adapted to operate at high peripheral speed where the relative difference in the speed between inner rotating and outer stationary collector rings can be more than 10,000 feet per minute. The rolling resilient metallic elements provide a large current collecting surface between the two collector rings, as the rolling resilient elements will be somewhat flattened as indicated in Fig. 2. The resilient elements and the cage comprising cage rings 35 and connected shafts 31 are free to rotate, similar to the rotation of ball bearing or roller bearing cages, during the rotation of the device. Thus the contact between the rotating collector ring and the resilient rollers and between the resilient rollers and the stationary collector ring is entirely a rolling contact. Only rolling friction is developed, and no current is required to pass through the shaft on which the rotating and rolling resilient elements are mounted. The current passes directly from rotating collector rings through the resilient rolling elements to the stationary collector rings. High current densities such as, for example, 200 amperes per square inch can thus be adequately collected and transferred.

In Fig. 3 I have shown a slight modification of the resilient rollers, in that the cross-section of the rolling resilient metallic elements in this case is substantially oval with the races in which case rotating and stationary collector rings are being modified to suit the external contour of the resilient elements.

In Figs. 4 and 5, however, I have shown a slightly different arrangement, wherein the cage comprising the rings 35 and shafts 31, serve to mount a plurality of spaced rollers 45 with intermediate and slightly smaller idler rollers 46. In this case the rollers themselves are not resilient. The current collectors are resilient metallic belts 47, mounted on the belt rollers 45 spaced slightly less than half the cage, so that two belts are utilized around the cage. The idler rollers hold the belt in proper position, and also serve to conduct electric current from rotating collector ring to the stationary collector ring. In this case the belt surfaces may be convex to fit concave ring surfaces. I also prefer to position a spacing roller 48 between the belt rollers at the end curvatures of the belts. Four or more belts if desired can be utilized spaced symmetrically around the circumference of rotating collector rings.

It will be seen that extremely large collecting surfaces will be in contact with both the rotating and stationary collector rings. All of the current is carried through the belt and body of the rollers, none being passed through ends of the shafts of the rollers. The cage rotates and again only rolling contact is made.

In Fig. 6 I have shown a modification of my invention as applied to a commutator type D. C. machine. Here the commutator 60 is provided with the usual commutator segments 61 separated by insulators 62, and is adapted to be rotated as is customary in commutator type machines. A stationary brush mounting member 63 is provided in the form of a pin, with cross-sectional area sufficient to conduct current through, upon which is mounted a series of resilient elements 64 rolling in a channel similar, for example, to the rolling resilient elements arrangement shown in Fig. 3, these resilient elements being mounted on shafts 65 attached to cage rings 66. An outer rotating ring 67 is mounted on resilient elements 64 which are slightly flattened as shown in Fig. 6. On the outer surface of rotating ring 67 is mounted a resilient metallic tire 70. This tire is shown in detail in Fig. 7, and comprises inner and outer concave portions 71 and 72 joined at the edges only. The outer surface of member 67 is concaved to fit the tire. Thus the tire 70 is resilient and may be pressed against the commutator 60 to provide contact over an extended area of the periphery of the commutator as shown by numeral 73 in Fig. 6. Under these conditions current is transferred from the commutator segments into tire 70 and thence by direct contact to rotating ring 67 without, however, any friction therebetween as tire 70 is stationary with respect to ring 67. Current is then transferred by rolling friction only through rolling resilient elements 64 to the stationary pin member 63. Thus the current, in passing from the commutator to the stationary pin member 63 passes between surfaces having rolling friction only therebetween. All moving surface contacts are rolling. Arcing or sparking is greatly reduced, and contact surfaces capable of carrying greater current densities are provided.

In Figs. 8 and 9 I have shown a modification of the tire construction. In this case the tire 70 comprises an inner resilient metal fabric member 80 having wound on the outside thereof a spring wire 81. In Fig. 9 I have shown the spring wire turns spaced much farther apart than in actual practice, in order to show the actual construction more clearly. The overall section of this combination fabric and spring wire tire is essentially oval, and the tire fits the same type of rotating ring and in the same manner as the tire 70 fits the rotating ring 67. The action of the composite tire is the same as has been previously described in conjunction with Fig. 6, in that the spring wire and the fabric will compress when placed in contact with the commutator, a number of spring wire turns will contact the commutator, and the current will be transferred through the tire by virtue of the conductivity of the metal fabric between opposite sides of the spring wire turns. It will be noted that in this case, as in the case of the tire described in conjunction with Figs. 6 and 7, that the tire does not move with respect to the rotating ring 67 and fixed contact only is made therewith by the tire around the outer periphery of this rotating ring 67.

From the above, it will be seen that by means of my invention, I am able to transfer current from a rotating member to a stationary member without the current passing through any rubbing surface or surfaces. Rubbing friction is eliminated entirely and rolling friction substituted completely therefor. Such an arrangement leads to the transfer of electrical current between two relatively moving members at high efficiency, without arcing or sparking, and permits the use of high peripheral speeds of rotating conducting surfaces and the use of high current densities. A very large contact area is provided so that by the permitted use of high current densities, plus the large contact area, extremely large currents can be safely transmitted between rotating and stationary members. Utilization of high peripheral speed permits higher voltage to be induced per unit length of effective armature conductor. The electric machines can be of lesser weight for the same rating than similar machines commonly constructed heretofore.

I claim:

1. Means for transferring electrical current between spaced relatively moving parts comprising an intermediate member having a resilient periphery in contact with both of said parts, and means for mounting said member to roll during the relative movement of said parts.

2. Means for transferring electrical current between spaced relatively moving parts comprising an intermediate member having a resilient periphery in contact with both of said parts, and means for mounting said member to roll during the relative movement of said parts, said contacts being of substantial extent along said parts.

3. Means for transferring electrical current between spaced relatively moving parts comprising an intermediate member having a resilient periphery in contact with both of said parts, and means for mounting said member to roll and revolve freely during the relative movement of said parts with rolling friction only at said contacts, said contacts being of substantial extent along said parts.

4. Means for transferring electrical current between relatively moving parts comprising opposed concave surfaces on said parts, an intermediate member having a resilient periphery engaging and substantially fitting the cross section of both of said surfaces, and means for mounting said member to roll freely between said surfaces during relative motion of said parts.

5. Means for transferring electrical current between relatively moving parts comprising opposed concave surfaces on said parts, an intermediate member having a resilient periphery engaging and substantially fitting said surfaces, and means for mounting said member to move freely between said surfaces during relative motion of said parts, said contacts being of substantial extent along said parts.

6. Apparatus in accordance with claim 5 wherein said member has a circular cross section before distortion to form said extended contacts.

7. Apparatus in accordance with claim 5 wherein said parts are opposed, inner and outer collector rings mounted to revolve one relative to the other, and wherein a plurality of said members are positioned intermediate said rings.

8. Apparatus in accordance with claim 5 wherein said parts are opposed, inner and outer collector rings mounted to revolve one relative to the other, and wherein a plurality of said members are positioned intermediate said rings, each of said members being provided with a central shaft, and a cage ring on each side of the space between said collector rings, said shafts being mounted on said rings to form a cage, said cage being free to revolve during rotation of one of said rings, with said members free to revolve on said shaft.

9. Apparatus in accordance with claim 5 wherein said parts are opposed, inner and outer collector rings mounted to revolve one relative to the other, and wherein said member is an endless belt.

10. Apparatus in accordance with claim 5 wherein said parts are opposed, inner and outer collector rings mounted to revolve one relative to the other, and wherein said member is an endless belt, a cage ring on each side of the space between said collector rings, and spaced belt rollers mounted on said cage rings between said collector rings, said belt passing around said belt rollers at each recurved portion thereof.

11. Apparatus in accordance with claim 5 wherein said parts are opposed, inner and outer collector rings mounted to revolve one relative to the other, and wherein said member is an endless belt, a cage ring on each side of the space between said collector rings, and spaced belt rollers mounted on said cage rings between said collector rings, said belt passing around said belt rollers at each recurved portion thereof, and a plurality of idler rollers mounted on said cage rings intermediate said belt rollers and positioned between the opposite portions of said belt.

12. In combination with an electric machine having a commutator, a commutator contact member provided with a flexible body portion and a series of rolls arranged on an arc of a circle within said flexible body portion, said flexible body portion contacting at least two segments of the commutator, substantially as described.

13. In combination with an electric machine having a commutator, a commutator contact member provided with a flexible body portion, and a series of at least four rolls arranged on an arc of a circle within said flexible body portion contacting at least two segments of the commutator, substantially as described.

JAMES T. SERDUKE.